United States Patent [19]

Pihery et al.

[11] 4,359,814
[45] Nov. 23, 1982

[54] MACHINE TOOL WITH AUTOMATIC TOOL CHANGING

[75] Inventors: Jean-Rene Pihery, Ulis-Bures-sur-Yvette; Jean-Pierre Sanguiol, Meudon-la-Foret; Michel Turlet, Paris, all of France

[73] Assignee: Regie Nationale des Usines Renault, Boulogne-Billancourt, France

[21] Appl. No.: 172,741

[22] Filed: Jul. 28, 1980

[30] Foreign Application Priority Data

Jul. 31, 1979 [FR] France ................... 79 19710

[51] Int. Cl.³ .................................. B23Q 3/157
[52] U.S. Cl. ................... 29/568; 29/27 C; 82/2 E
[58] Field of Search ........... 29/568, 27 C; 409/144; 82/2 E; 408/35

[56] References Cited

U.S. PATENT DOCUMENTS

| | | | |
|---|---|---|---|
| 3,180,187 | 4/1965 | McFerren | 82/2 E |
| 3,186,085 | 1/1965 | Coate | 29/568 |
| 3,524,248 | 8/1970 | Durr et al. | 409/144 X |
| 3,601,886 | 8/1971 | Gohren | 29/568 |
| 4,038,739 | 8/1977 | Nohejl | 29/568 |
| 4,197,040 | 4/1980 | Wawrzyniak | 29/27 C |

FOREIGN PATENT DOCUMENTS

| | | | |
|---|---|---|---|
| 23351 | 2/1981 | European Pat. Off. | 29/568 |
| 2743462 | 6/1978 | Fed. Rep. of Germany | 29/568 |
| 2847418 | 5/1979 | Fed. Rep. of Germany | 29/568 |
| 482496 | 1/1970 | Switzerland | 29/568 |
| 588098 | 1/1978 | U.S.S.R. | 29/568 |

OTHER PUBLICATIONS

"Operational Class of Mach. Tools" by Y. D. Vragov, vol. 15, *Machines and Tooling*, pp. 5–6.

*Primary Examiner*—William R. Briggs
*Attorney, Agent, or Firm*—Beveridge, DeGrandi & Kline

[57] ABSTRACT

A machine tool has a rotating head provided with a radially movable carriage. Transferrable tool holders are clamped to the carriage of the head by a releasable clamping mechanism. A plurality of tool holders are held on an indexable drum, the rotational axis of which lies perpendicular to the axis of rotation of the head. The tool holders are slidably transferred from the drum to the carriage of the head and vice versa by a changer which has a transfer rod and a mechanism for actuating the clamping mechanism.

9 Claims, 4 Drawing Figures

MACHINE TOOL WITH AUTOMATIC TOOL CHANGING

BACKGROUND OF THE INVENTION

This invention is applicable to machine tools exemplified by numerically controlled boring and/or facing machines, referred to herein generically as boring-facing machines, wherein a rotationally driven head carries a cutting tool which is movable transversely with respect to the axis of head rotation.

Heretofore, there has been a substantial gap between specialized high speed boring and facing machines which are constructed to make a specific piece, and the versatile but substantially less productive numerically controlled machines.

The machine of the present invention is simple in structure and is capable of providing a variety of machining operations at a high rate of productivity.

SUMMARY OF THE INVENTION

According to the invention, a machine tool has a head which, during machining operations, is rotationally driven and carries a cutting tool movable transversely to the axis of head rotation. A carriage, radially movable on the head, receives a tool holder which is held on the carriage by a clamping means. For automatic tool transfer, there is an indexable drum, rotatable about an axis which is perpendicular to the axis of head rotation, and provided with circumferentially spaced means for receiving a plurality of tool holders. Means are provided for slidably transferring tool holders from the carriage to the drum and vice versa, and means are provided for clamping the tool holders to and from the carriage.

The apparatus preferably has a number of additional features. For example, the tool holding transfer means is operable to move the tool holders in a direction parallel to the axis of drum rotation. The transfer means and the means for operating the clamping means are retractable to a position where they are spaced from the drum to avoid interference with the rotational movement of the drum. The tool holder base plates have dovetailed guides which are received in corresponding dovetail guides in the carriage and the drum.

Further, the preferred means for transferring the tool holders between the carriage and drum includes an axially movable rod provided at its end with an expansible head for entering and engaging a recess in the ends of the tool holders.

The mechanism for clamping the tool holders to the carriage of the machine tool head preferably includes a set of rods slidably mounted in the carriage. Each rod has a trapezoidal notch with an inclined surface which, under the influence of a biasing spring, clampingly engages and bears against the guide of the tool holder base plate. The rods are movable along their own axes to unclamping positions, such movement being effected by a shaft which is movable along its own axis and is provided with inclined surfaces which contact corresponding inclined surfaces on the rods. Axial movement of the rod may be provided by providing the carriage with an axially immovable rotatable nut, threadedly engaged with the shaft and rotated by a screwdriving mechanism which comprises the means for operating the clamping mechanism.

As a precaution against unwanted movement of the tool holder on the carriage, the carriage may be provided with a further rod which is axially movable by a further inclined plane on the clamping mechanism shaft. The orientation of the further inclined plane is such that, when the inclined surfaces of the notches are in clamping engagement against the tool holder base plate, the further rod occupies an extended position where it extends into a recess in the tool holder; and, when the inclined surfaces of the notches are in their unclamped positions, the further rod is retracted from the tool holder recess.

The mutual cooperation of the rotating machine tool head and the tool changer, the transferring of a tool holder from the drum of the tool changer to the carriage of the plate, and vice versa, is accomplished by a simple movement involving the sliding of the tool holder. The tool holder is moved in a direction which is parallel to the direction the carriage moves on the machine tool head perpendicular to the rotary axis of the machine tool head, and parallel to the rotational axis of the drum which carries a plurality of tool holders. The tool holder can simply be slipped, as a slide, from the carrier of the head onto the drum, and vice versa.

Tool holder transfer, clamping and unclamping are accomplished when the rotating machine tool head is stopped in a position in which the direction of carriage mobility on the head coincides with the direction of mobility of the mechanisms for transferring the tool holder and actuating the clamping mechanism. At the time of transfer, the drum is in a position where a tool holder guide on the drum is aligned, in the direction of mobility of the transferring mechanism, with a tool holder guide on the carriage.

The transfer of a tool holder, together with the clamping or unclamping of the tool holder on the carriage, is performed by the tool changer, all operations being capable of taking place automatically under instructions from the numerical control of the machine. The tool changer is installed permanently, while the machine tool head, preferably rotated about a horizontal axis, may have a monoaxial mobility along its axis of rotation, biaxial mobility along its axis of rotation and along a horizontal or vertical axis perpendicular to its axis of rotation; or triaxial mobility along its axis of rotation and along horizontal and vertical axes which are perpendicular to its axis of rotation.

Other characteristics and advantages of the invention will be apparent from reading the description which follows of an illustrative and nonlimiting embodiment of a machine tool with tool changing in conformity with the invention which is shown in the annexed drawings.

DESCRIPTION OF A PREFERRED EMBODIMENT

Figure 1:
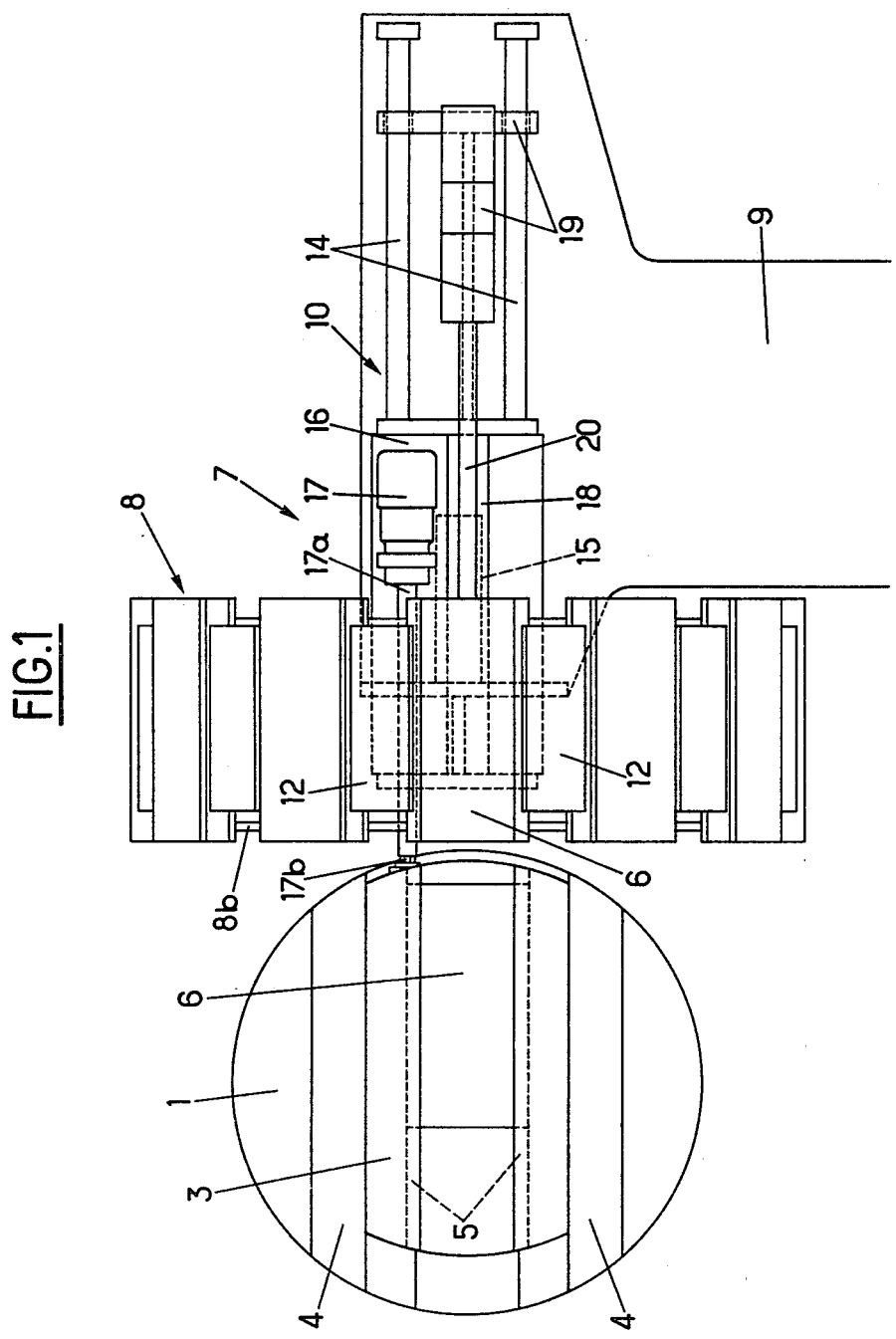
FIG. 1 is an elevational view of the head of a boring-facing machine and a tool changer therefor in the tool-changing position.
Figure 2:
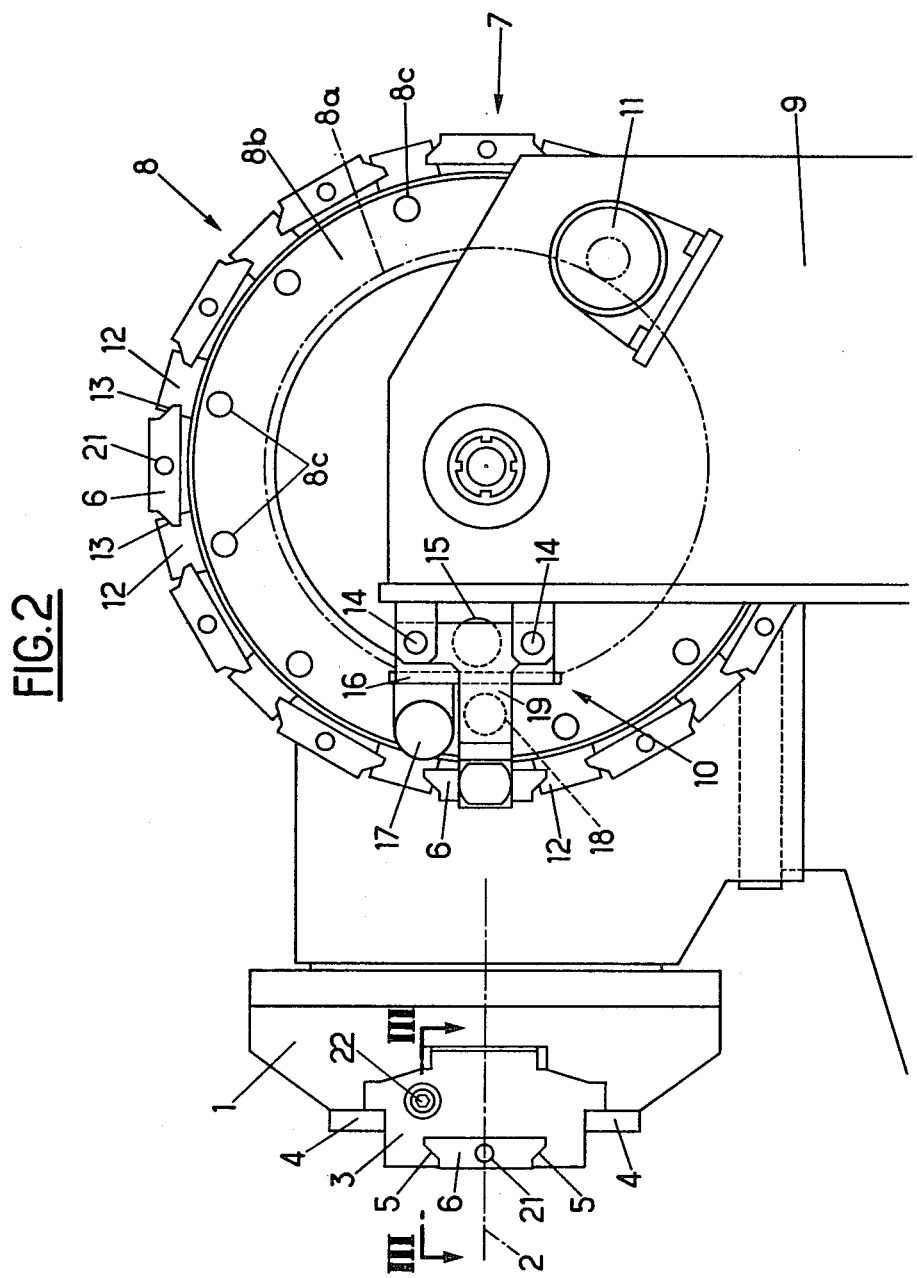
FIG. 2 is an elevational view of the apparatus, taken in the direction of the arrow II in FIG. 1, with the head of the machine being displaced along its axis of rotation from its tool-changing position.

In FIGS. 1 and 2, only the head 1 of a boring-facing machine is shown. The head 1 is rotationally driven around a horizontal axis of rotation 2 as shown in FIG. 2. A carriage 3 sliding in a guide 4 is driven radially on the head 1 during facing operations by a mechanism which is not shown. During constant diameter boring operations, the rotary head 1 is advanced axially and the carriage 3 remains stationary with respect to the head. The carriage 3 has a dovetailed guide 5 slidably receiving a transferrable tool holder base plate 6. The tool holder base plate 6 has a dovetailed profile corresponding to that of the guide 5, and during tool changing operations, it is movable parallel to the direction of movement of the carriage 3 on the head 1. The tool carried by the base plate 6, not shown, has a cutting edge which is displaced from the rotational axis of head 1.

The head 1 itself, in addition to the rotational movement mentioned above, may be driven to provide an axial displacement along its axis of rotation 2, horizontal displacement perpendicular to the axis 2 and vertical displacement perpendicular to the axis 2.

A tool changer generally designated 7, is installed permanently beside the boring-facing machine. The tool changer 7 includes an indexable drum 8 and a transfer mechanism 10, both of which are mounted on a stationary support 9. The drum 8 carries a plurality of tools on tool holders 6 and it is rotatable about a horizontal axis which perpendicularly intersects the rotational axis 2 of the machine tool head 1. The transfer mechanism 10 transfers tool between the carriage 3 and drum 18, and it also acts to clamp and unclamp the tool holder base plates 6 to and from the carriage 3 of the rotating head 1.

The drum 8 is driven by a motor 11 which, as shown in FIG. 2, engages internal gear 8a on the drum rim 8b. The drum 8 carries blocks 12 at equal intervals on its circumference. Each block 12 has a pair of opposing grooves 13, configured so that the grooves of two neighboring blocks 12 provide a dovetailed guide for one of the tool-holding base plates 6. In conformity with this orientation, the base plate 6 is mounted on the rotating head 1 where it is able to slide in a direction parallel to the axis of rotation of the drum 8.

The mechanism 10 for effecting clamping, unclamping and transfer is mounted on the base 9, displaced to one side of the rotational axis of the drum 8. The relative positions of these components is such that a tool holder base plate 6 on drum 8 has the same orientation as it occupies when on the head 1.

The transfer mechanism 10 includes two stationary horizontal guide rods 14 fastened to the support 9. A carrier 16 is slidably movable on the two rods 14 by means of a jack 15. The carrier 16 supports a screwdriving mechanism 17 whose output shaft 17a extends toward the head 1 and has a hexagonal free end 17b. A jack 18 on carrier 16 slidably moves a second carrier 19 on the rod 14. A transfer rod 20, extending toward the head 1, is also mounted on the carrier 19.

Each tool holder base plate 6 has an aperture 21 centered at one end thereof, leading to a recessed chamber. An expansible head of a known type, capable of entering and engaging within the recessed chamber, is located at the free end of the transfer rod 20. The transfer rod 20 is arranged so that when the plate 1 and the drum 8 are in the tool-changing position the transfer rod 20 is aligned with the aperture 21 in a tool holder base plate 6 on carriage 3 or at the tool-changing position of the drum 8.

For its part, the output shaft 17a of the screwdriving mechanism 17 is positioned so that, when the head 1 and the drum 8 are in the tool-changing position, the shaft 17a is aligned with a nut 22 on the carriage 3 and with one of the holes 8c in the rim 8b of drum 8.

Figure 3:
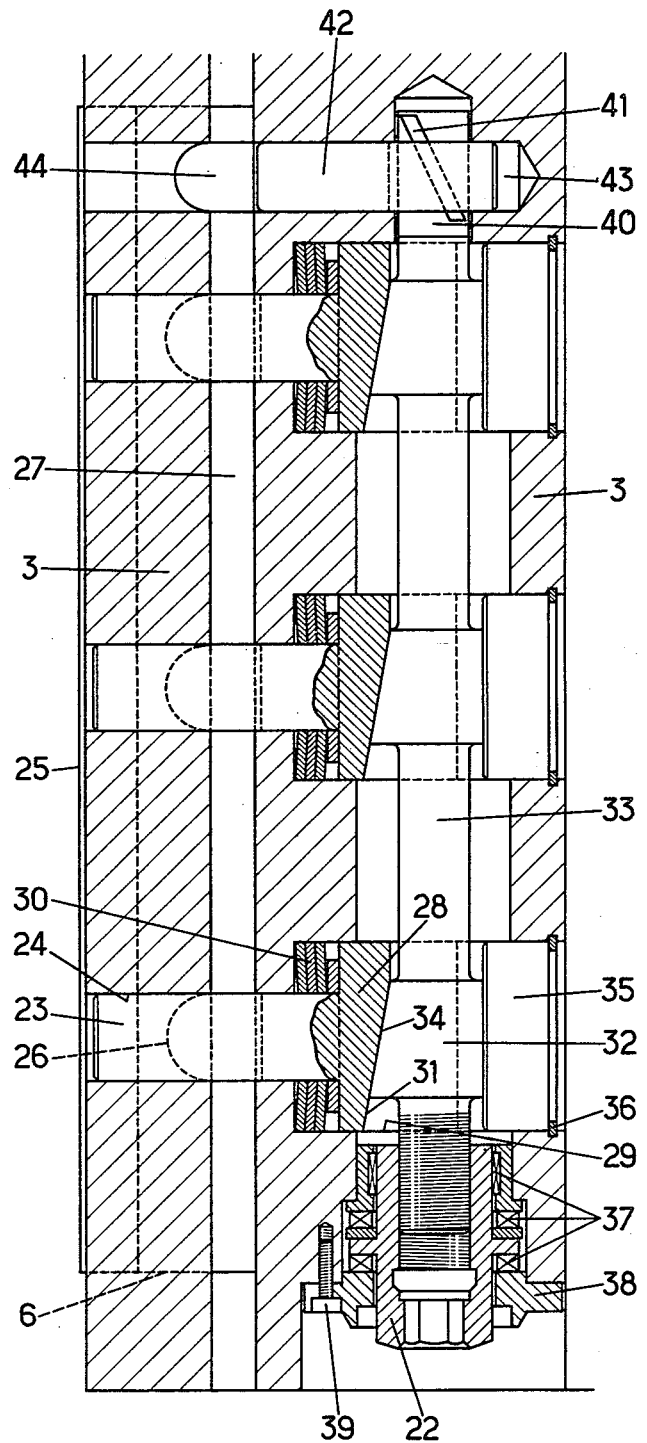
FIG. 3 is an enlarged sectional view of the carriage of the machine head, as seen along the line III—III in FIG. 2, showing the components which clamp the tool holder base plate to the carriage.
Figure 4:
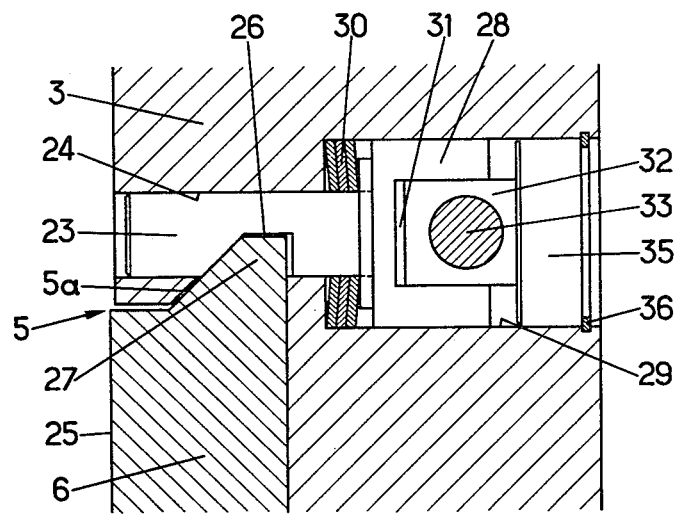
FIG. 4 is a sectional view perpendicular to that in FIG. 3, showing one of the clamping elements and its operating mechanism.

FIGS. 3 and 4 show the means of clamping the tool holder base plate 6 onto the carriage 3 of the head 1.

FIG. 4 shows half of a tool holder base plate 6 and half of the dovetail guide 5 which comprises a trapezoidal groove 5a in the carriage 3. As shown in FIG. 4, several retainer rods 23 are slidably mounted in bores 24 in the carriage 3, distributed along the guide 5 so that their axes lie perpendicular to the outer face 25 of the plate 6 are coplanar with the extreme lateral face of the groove 5a. Each retainer rod 23 has a transverse notch 26 which conforms to the trapezoidal shape of the lateral projection 27 of the plate 6. As shown in FIG. 4, the projection 27 extends through the notches 26 of the rods 23. The depth of the notch 26 as seen in FIG. 4 corresponds approximately to the radius of the rod 23, while the notch width, measured in the longitudinal direction of the rod 23, is slightly greater than the thickness of that portion of projection 27 which is disposed within the notch.

Each rod 23, at its end which is opposite from the face 25 has a yoke 28 of circular transverse section, slidably mounted in an enlarged cylindrical portion 29 of the respective bore 24. Conical spring washers 30 are inserted between the base of the yoke 28 and the shoulder where enlarged bore portion 29 meets the smaller diameter portion of bore 24. The bottom of the yoke 28 is an inclined plane 31 as seen in FIG. 3. Within each yoke 28 there is an enlargement 32 on a common actuating shaft 33, the latter lying parallel to the guide 5 of the carriage 3. Each enlargement 32 has an inclined planar surface 34 turned toward and contacting the inclined plane 31 of the yoke 28. The opposite face of each enlargement 32 is perpendicular to the axis of the rod 23 and bears against a stopper plug 35 kept in the enlarged bore portion 29 by a retainer ring 36.

FIG. 3 shows the components which move the shaft 33 axially to clamp and unclamp the tool carrier from a support. The shaft 33 has a threaded end section which faces one of the frontal faces of the carriage 3. The rotatable nut 22 is axially immovable with respect to the carriage 3 due to the presence of several bearings 37 and a cover 38 which is affixed to the carriage 3 by screws 39.

At its other end, shown at the upper portion of FIG. 3, the shaft 33 has a portion 40 of semicircular cross-section. The shaft portion 40 has, projecting from its flat face, a tongue 41 which is inclined with respect to the axis of shaft 33. The tongue engages in a groove having a corresponding width and inclination in the flat face of a rod 42 of semicircular section. The rod 42 is parallel to the rods 23 and it is slidably mounted in a bore 43 in the tool holder base plate 3. As seen in FIG. 3, the tongue 41 is inclined in the opposite direction from the inclined planes 34 of the enlargements 32 of shaft 33. The portion 27 of the tool holder base plate 6 also has a bore 44 which, when the base plate 6 is in its working position on the carriage 3, is aligned with the bore 43. The inclined plane 41 moves the rod 42 between two positions. In one position, the rod 42 projects into the bore 44 of the base plate 6, and in the other position illustrated in FIG. 3, it is withdrawn from the bore 44.

A tool-changing operation in accordance with the invention will be described below.

At the end of a machining cycle, the head 1 is brought, by the numerical control system into the tool-changing position where the tool holder base plate 6, clamped to the carriage 3, is aligned with the transfer mechanism 10 of the tool changer 7. At the same time, the numerical control system brings the drum 8 of the tool changer 7 to a position where an empty guide between two adjoining blocks 12 is aligned with the mechanism 10.

Then, jack 15 advances the carrier 16 toward the rotary head until the hexagonal free end 17b of the shaft 17a of the screwdriving mechanism 17 projects into the nut 22 of carriage 3. Simultaneously, the carrier 19 is advanced by jack 18 until the head of the transfer rod 20 projects into the hole 21 of the tool holder base plate 6. The head of rod 20 expands to engage the base plate 6. Screwdriving mechanism 17 is actuated to turn the nut 22 in the unclamping direction, causing shaft 33 to move axially. This movement causes the inclined planes 34 to slide on the inclined planes 31 of the clamping rods 23, pushing the latter against the force of the spring washers 30. As a result, the inclined edges of the notches 26 of rods 23 disengage themselves from their clamping contact with the corresponding inclined edge of the guide tongue 27 of the base plate 6. At the same time, the inclined plane of tongue 41 on shaft 33 slides the rod 42 to retract it from the bore 44 in the tool holder base plate 6.

By operating the jack 18 in a retracting direction, the transfer rod 20 withdraws the unclamped base plate 6 from the carriage 3 and transfers it into the unoccupied guide of the drum 8. The jack 15 is then actuated to retract the entire transfer device 10, and the head of the transfer rod 20 disengages itself from the hole 21 of the base plate 6.

The numerical control of the machine tool causes the drum 8 to turn, bring into the tool-changing position a base plate 6 which carries the tool intended for the subsequent machining phase. The carriers 16 and 19 are again advanced toward the head 1 by the jacks 15 and 18, inserting the free end of the shaft 17a of the screwdriving mechanism 17 in the nut 22, inserting the head of the transfer rod 20 in the recessed hole 21 of the base plate 6 and pushing the tool holder on drum 8 into the guide 5 of the carriage 3.

As soon as the tool-holding base plate 6 is in the stop position on the carriage 3, the screwdriving mechanism 17 is actuated in the clamping direction to draw the shaft 33 toward the nut 22. This causes the inclined planes 34 to slide on the inclined planes 31, enabling the springs 30 to displace the rods 23 and cause the inclined edges of the notches 26 of the rods 23 to bear frictionally against the inclined edges of the guide projection 27 of the base plate 6. At the same time, the inclined plane 41 of shaft 33 moves the end of rod 42 into the bore 44 in the base plate 6. The actual clamping of the tool-holder base plate 6 onto the carriage 3 is accomplished by the force of the conical spring washers 30. The rod 42 provides additional security by preventing the base plate 6 from being ejected from the rotary head by centrifugal force.

The entire device 10 is then retracted to withdraw the head of the transfer rod 20 from the hole 21 of the base plate 6 and to withdraw the end 17b of the shaft 17a of the screwdriving mechanism 17 from the nut 22 of the carrier 3. When withdrawn a sufficient distance, the shaft 17a and the transfer rod 20 will no longer interfere with the rotation of the drum 8.

The numerical control of the machine tool makes it possible for the entire tool-changing operation to occur without outside intervention, this operation includes the initial axial and rotary placement of the rotary head 1 in the tool-changing position, indexing the drum, transferring, clamping and unclamping.

It can be clearly seen from the above description and the annexed drawings that the changing of a tool between the radially movable carriage 3 of the boring-facing head 1 and the drum 8 is extremely simple since it only involves a translatory sliding movement of the base plate 6. Tool transfer is facilitated both because the axis of the carriage 3 when in its tool changing position is perpendicular to and intersects the rotational axis of the boring and facing head 1, and because the rotary head 1 of the boring-facing machine is tangential to the drum 8. As a result, the mechanism for changing tool, including the clamping and unclamping components thereof, are also very simple.

Of course, it would be possible to replace certain elements of the machine tool and its tool changer with equivalent elements without departing from the present invention. Furthermore, the invention can also be applied to machine tools other than boring-facing machines with rotating heads. If such a head were rotated about a vertical axis during machining operations, it would suffice to reposition the transfer mechanism 10 at another position on the circumference of the drum. In view of the myriad possibilities available, it is emphasized that the invention is not limited to the disclosed embodiments but is embracing of a variety of other structures which fall within the spirit of the following claims.

We claim:

1. Machine tool apparatus with automatic tool changing, comprising,
   a head which during machining operations is rotated about an axis and carries a cutting tool movable transversely to said axis,
   an indexable rotatable drum for carrying a plurality of tool holders,
   a plurality of tool holders which are transferrable between the head and said drum, said tool holders including base plates which have dovetailed profiles,
   said head having a carriage which is radially movable thereon, said carriage being provided with dovetailed guide means for receiving the base plates of said tool holders,
   said drum having an axis of rotation which is perpendicular to the axis of rotation of said head, said drum having circumferentially spaced dovetailed guide means for receiving the base plates of a plurality of said tool holders,
   transfer means for slidably transferring tool holders from the carriage to the drum and vice versa, said transfer means being operable to move the tool holders parallel to the axis of rotation of the drum,
   clamping means for clamping said tool holder to the carriage, said clamping means including a plurality of rods mounted in the carriage on one side of the dovetailed guide thereof, each of said rods having a trapezoidal notch with an inclined surface for bearing against the guide of the tool holder base plate, springs for urging the inclined surfaces of the notches into clamping engagement against the guide of the tool holder base plate, an axially movable shaft, said shaft and said rods having mutually contacting inclined surfaces which move said rods along their axes in response to movement of the shaft along its axis, and means for operating the clamping means to clamp and unclamp the tool holders to and from the carriage, said transfer means and said means for operating the clamping means being spaced from the drum to avoid interference with the rotational movement of the drum.

2. The machine tool apparatus of claim 1, including an axially immovable rotatable nut threadedly engaged with said shaft, said means for operating the clamping means including a screwdriving mechanism for rotationally driving said nut.

3. The machine tool apparatus of claim 2 wherein the tool holder base plate is provided with a recess, said shaft having a further inclined plane, a further rod mounted in the carriage and being movable by said further inclined plane between a retracted position and an extended position where the end of the rod projects into said recess in the tool holder base plate, said further inclined plane being oriented so said further rod will be in its extended position when the inclined surfaces of the notches are in clamping engagement against the guide of the tool holder base plate, said further rod occupying its retracted position when the inclined surfaces of the notches are not in clamping engagement against the guide of the tool holder base plate.

4. The machine tool apparatus of claim 1, wherein each tool holder has a recess at one end thereof, and the means for slidably transferring tool holders includes an axially movable rod with an expansible head at its free end for entering and engaging the recess.

5. In a machine tool apparatus with automatic tool changing such as a numerically controlled boring-facing machine having a rotationally driven head, a carriage which is movable on said head radially to the axis of rotation of said head, said carriage having means for receiving a tool holder and means for clamping and unclamping the tool holder to the carriage, the improvement comprising, a guide on the carriage and comprising the means for receiving a tool holder on the carriage, said guide extending in the direction of movement of the carriage on the head, a tool holder including a plate which has a profile corresponding to that of said guide, a tool changer located at a stationary position beside the head, said tool changer being provided with an indexable drum having its axis of rotation perpendicular to the axis of rotation of said head, said drum having a plurality of circumferentially spaced guides for receiving a plurality of tool holder plates, said guides on the drum extending parallel to the axis of rotation of said drum and having the same profile as the guide on the carriage, said tool changer including a transfer mechanism and a clamp operating mechanism which are not rotatable with the drum, said transfer mechanism including means for slidably transferring a tool holder plate from the carriage to the drum and from the drum to the carriage in a direction which is parallel to the rotational axis of the drum and perpendicular to the rotational axis of the head, said clamp operating mechanism including means for actuating the means for clamping and unclamping the tool holder to the carriage.

6. The machine tool apparatus of claim 5, wherein the profile of said guides and said plate is a dovetail profile, said means for clamping and unclamping a tool holder plate to said carriage including a plurality of rods mounted in the carriage on one side of the dovetail guide thereof, each of said rods having a trapezoidal notch with an inclined surface, springs for urging the inclined surfaces of the notches into clamping engagement against one of the inclined surfaces of a tool holder plate located in said guide, and an axially movable shaft, said shaft and said rods having mutually contacting surfaces which are inclined to move said rods along their axes in response to movement of the shaft along its axis.

7. The machine tool apparatus of claim 6 wherein the means for clamping and unclamping the tool holder to the carriage includes an axially immovable rotatable nut threadedly engaged with said shaft, said clamping mechanism of the tool changer including a screwdriving mechanism for rotationally driving said nut.

8. The machine tool apparatus of claim 6 wherein the tool holder plate is provided with a recess, said shaft having a further inclined plane, a further rod mounted in the carriage and being movable by said further inclined plane between a retracted position and an extended position where the end of the rod projects into said recess in the tool holder base plate, said further inclined plane being oriented so said further rod will be in its extended position when the inclined surfaces of the notches are in clamping engagement against the guide of the tool holder base plate, said further rod occupying its retracted position when the inclined surfaces of the notches are not in clamping engagement against the guide of the tool holder base plate.

9. The machine tool apparatus of any one of claims 5–8 wherein each tool holder has a recess at one end thereof, and the means for slidably transferring tool holders includes an axially movable rod with an expansible head at its free end for entering and engaging the recess.

* * * * *